(12) United States Patent
Lin et al.

(10) Patent No.: US 8,119,724 B1
(45) Date of Patent: Feb. 21, 2012

(54) SHRINKAGE-RESISTANT POLYMERS

(75) Inventors: Chiu-Sing Lin, Rocky Hill, CT (US); Thomas Fay-Oy Lim, Killingworth, CT (US); Bahram Issari, Glastonbury, CT (US)

(73) Assignee: Henkel Corporation, Rocky Hill, CT (US)

( * ) Notice: Subject to any disclaimer, the term of this patent is extended or adjusted under 35 U.S.C. 154(b) by 808 days.

(21) Appl. No.: 11/549,278

(22) Filed: Oct. 13, 2006

(51) Int. Cl.
*C08L 83/00* (2006.01)
*C08L 31/00* (2006.01)
*C08L 33/00* (2006.01)

(52) U.S. Cl. ............... 524/506; 524/556; 524/560

(58) Field of Classification Search .............. 524/506, 524/556, 560
See application file for complete search history.

(56) References Cited

U.S. PATENT DOCUMENTS

| 3,504,080 | A | * | 3/1970 | Walter et al. | 264/235 |
| 4,772,031 | A | * | 9/1988 | Poppo | 277/316 |
| 4,965,129 | A | * | 10/1990 | Bair et al. | 428/398 |
| 6,930,147 | B1 | * | 8/2005 | Nakagawa et al. | 525/104 |

\* cited by examiner

*Primary Examiner* — Karuna P Reddy
(74) *Attorney, Agent, or Firm* — Steven C. Bauman; James E. Piotrowski

(57) ABSTRACT

The present invention provides moisture curable polyacrylate compositions, which cured elastomers thereof demonstrate improved resistance to shrinkage when exposed to hydrocarbon fluids such as transmission fluids and oil and fuel based fluids. Such compositions include:
  a) a moisture curable silyl functionalized polyacrylate; and
  b) at least one hydrocarbon fluid-absorbing component,
    wherein the hydrocarbon-fluid absorbing component is present in an amount sufficient to reduce shrinkage of the cured composition when exposed to a hydrocarbon fluid.

16 Claims, No Drawings

SHRINKAGE-RESISTANT POLYMERS

FIELD OF THE INVENTION

The present invention provides moisture curable polyacrylate compositions, which cured elastomers thereof demonstrate improved resistance to shrinkage when exposed to hydrocarbon fluids such as transmission fluids and oil and fuel based fluids.

BRIEF DESCRIPTION OF RELATED TECHNOLOGY

Polyacrylate compositions have excellent sealing and adhesive properties, and have many commercial uses. For instance, they can be formed into gaskets which are used extensively in the automotive industry or applied as conformal coatings in electronics applications.

In use, polyacrylate compositions may become exposed to a variety of conditions, including exposure to hydrocarbon fluids such as fuel oil or oil-containing products, transmission fluid, and other petroleum products. Polyacrylate compositions, however, frequently suffer from the drawback that they shrink when exposed to hydrocarbon fluids. Such volume shrinkage can occur, for example, due to the dissolution of additives such as plasticizers in the polyacrylates composition. A commercial incident of this event occurs within the engine, specifically the engine gaskets. If the engine gaskets shrink, fluids can start leaking from the engine, which is clearly not desirable. Accordingly, it would be desirable for a polyacrylate composition to be imparted with improved shrinkage-resistance

SUMMARY OF THE INVENTION

The present invention relates to moisture curable polyacrylate polymers which when cured exhibit volume shrinkage resistance when exposed to hydrocarbon fluids, and to methods for providing such resistance. The inclusion of certain additives in compositions of the invention can decrease or prevent volume shrinkage which occurs on exposure to hydrocarbon fluids. These additives include solid particles of absorbing hydrocarbon fluids. Proper adjustment of concentration of these additives can minimize or eliminate shrinkage totally.

In one aspect of the present invention, there is provided a composition which includes:
  a) a moisture curable silyl functionalized polyacrylate; and
  b) at least one hydrocarbon fluid-absorbing component,
    where the hydrocarbon-fluid absorbing component is present in an amount sufficient to reduce shrinkage of the cured composition when exposed to a hydrocarbon fluid.

In another aspect of the present invention, there is provided a composition which includes:
  a.) a moisture curable silyl functionalized polyacrylate; and
  b) at least one shrinkage-reducing component which reduces shrinkage of the cured composition upon exposure of the cured composition to a hydrocarbon fluid, where the shrinkage-reducing component is present in an amount to reduce shrinkage of the cured composition when exposed to a hydrocarbon fluid.

In still another aspect of the present invention, there is provided a method for preparing a shrinkage-resistant composition which includes the steps of:
  a) providing a silyl functionalized polyacrylate; and
  b) mixing the polyacrylate with a hydrocarbon fluid-absorbing component.

In yet another aspect of the present invention, there is provided a composition which includes:
  a) a moisture curable functionalized polyacrylate; and
  b) a polyolefin in particulate form present in an amount sufficient to reduce shrinkage of the cured composition and/or absorb hydrocarbon fluid when exposed to a hydrocarbon fluid.

DETAILED DESCRIPTION

In one aspect of the present invention, there is provided a composition which includes:
  a) a moisture curable silyl functionalized polyacrylate; and
  b) at least one hydrocarbon fluid-absorbing component,
    wherein the hydrocarbon-fluid absorbing component is present in an amount sufficient to reduce shrinkage of the cured composition when exposed to a hydrocarbon fluid.

As noted, one component contained in the compositions of the present invention is a silyl functionalized polyacrylate. The functionalization may be in the form of a pendant group or a terminal or end-capped group. In some embodiments of the present invention, the polyacrylate may be an alkyl acrylate polymer, such as an alkyl (meth)acrylate polymer. For purposes of the present invention, the term "(meth)acrylate" includes acrylates and methacrylates. More specifically, the backbone of the silyl end-capped alkyl (meth)acrylate polymer may include a homopolymer of $C_1$-$C_{10}$ (meth)acrylates or a copolymer of $C_1$-$C_{10}$ (meth)acrylates. Suitable alkyl acrylates include, but are not limited to, ethyl acrylate, butyl acrylate and 2-ethylhexyl acrylate. Copolymeric acrylate backbones may contain copolymerized units of up to 40 weight percent monovinyl monomers, for example, styrene, acrylonitrile, vinylbutyl ether, acrylic acid and $C_1$-$C_{10}$ alkyl acrylates different from the principal alkyl acrylate comonomer. Such copolymers are available commercially, for example, as Hytemps® acrylate rubbers (acrylic homopolymer and copolymer rubbers available from Nippon Zeon, KK) and Toacron® AR-601 acrylate rubbers (polyethylacrylate polymers, available from Toa Paint, KK).

In other embodiments of the present invention, the polyacrylate may be a polyfunctional (meth)acrylate polymer. Such polymers may have a high degree of functionality due to the presence of multiple functional groups in the main chain of the polymer.

Certain of such alkyl acrylate polymers are described more fully in U.S. Pat. No. 6,506,460 to Paglia et al, which is incorporated by reference herein in its entirety.

The silyl end-capped polyacrylates of the present invention may be of the following structure:

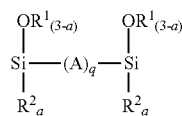

where R is as described above, a is integer from 0-3, q is an integer from 2 to about 1,000, and A is a hydrocarbon diradical containing at least one (meth)acrylate group. Desirably, a is 1 or 2. $R^1$ in each occurrence may be the same or different and is a $C_1$ to $C_{20}$ hydrocarbon radical. In a desirable aspect, $R^1$ is $C_1$ to $C_6$ alkyl. More desirably, $R^1$ is $C_1$ to $C_3$ alkyl.

$R^2$ in each occurrence may be the same or different, and is a $C_1$ to $C_{10}$ hydrocarbon radical. Substituent $R^2$, in combination with the oxygen to which it is attached, forms a hydrolyzable group, which provides the compositions of the present invention with their ability to undergo room temperature vulcanization (RTV). RTV cure typically occurs through exposure of the compositions of the present invention to moisture. The presence of hydrolyzable moisture curing groups, such as alkoxy groups, on the silicon atom permits the compositions of the present invention to crosslink. Suitable hydrolyzable groups include alkoxy groups such as methoxy, ethoxy, propoxy, and butoxy; aryl groups such as phenoxy; acyloxy groups such as acetoxy; aryloxy groups such as phenoxy; and alkoxyalkyl groups such as $CH_3OCH_2CH_2$—. Larger groups such as propoxy and butoxy are slower to react than smaller groups such as methoxy and ethoxy. Accordingly, the rate at which the compositions of the invention undergo moisture cure can be influenced by choosing appropriately sized groups for substituent $R^2$. Desirably, $R^2$ is $C_1$ to $C_4$ alkyl. More desirably, $R^2$ is methyl or ethyl.

As used herein, the term "hydrocarbon radical" is intended to refer to radicals which are primarily composed of carbon and hydrogen atoms. Thus, the term encompasses aliphatic groups such as alkyl, alkenyl, and alkynyl groups; aromatic groups such as phenyl; and alicyclic groups, such as cycloalkyl and cycloalkenyl. The term "hydrocarbon diradical" is intended to refer to the corresponding divalent radicals of these groups.

In a particularly desirable aspect, the polyacrylates of the present invention is sold by Kaneka® Corporation under the tradename KANEKA Telechelic Polyacrylate OR100S.

The backbone of the polyacrylate may be multifunctional, thereby imparting a higher degree of functionality to the polymer than the alkyl(meth)acrylate polymers described above. The monomer used to form the backbone of the polymer is not particularly restricted but a variety of monomers may be selectively employed. Suitable examples include, but are not limited to, (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth) acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, (meth)acrylic acid-ethylene oxide adduct, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth) acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth) acrylate, 2-perfluorohexadecylethyl (meth)acrylate, and the like. These monomers may be used each alone or a plurality of them may be copolymerized.

The polyacrylate may have a molecular weight distribution, i.e. the ratio of weight average molecular weight to number average molecular weight as determined by gel permeation chromatography, of less than 1.8, preferably not more than 1.7, more preferably not more than 1.6, still more preferably not more than 1.5, particularly not more than 1.4, and most preferably not more than 1.3.

Also included in the compositions of the present invention is at least one hydrocarbon fluid-absorbing component. The hydrocarbon fluid-absorbing component may present in an amount of about 1% to about 20% by weight of the composition. Desirably, the hydrocarbon fluid-absorbing component is present in an amount of about 1% to about 10% by weight of the composition.

The hydrocarbon fluid-absorbing component may be a polyolefin in particulate form, a reactive liquid, or a combination thereof. In an advantageous aspect, the polyolefin is present in amount of about 1% to about 20% by weight of the composition. As used herein, the term "polyolefin powder" is intended to be synonymous with a "polyolefin in particulate form."

It is believed that the presence of the polyolefin powder helps prevent shrinkage of the compositions of the invention by absorbing hydrocarbon fluid. Advantageously, the polyolefin is provided in the form of a particulate material or powder. The polyolefin powder will generally have an average particle size of about 0.1 to about 50 microns. Desirably, the polyolefin powder has an average particle size of about 20 microns. Polyolefin powders suitable for use in the inventive compositions typically have a melting point in the range from about 75° C. to about 175° C. When the inventive compositions have reached a temperature above the melting point of the polyolefin powder used therein, the polyolefin powder will typically be substantially dissolved in the inventive composition. A commercially available polyethylene powder suitable for the present invention are those sold under the trade name Microthene® by Equistar Chemical Company, with average densities ranging from 0.909 to 0.952 g/cc. Desirably, the polyolefin powder is Microthene® FN 510-00.

In one aspect, the polyolefin powder is comprised of a polyolefin containing repeating units of at least one $C_2$ to $C_7$ alkene monomer.

The inventive compositions may include moisture curing catalysts to further enhance or control the cure speed. Suitable moisture-cure catalysts include, without limitation, metal compounds which contain such metals as titanium, tin, or zirconium. Illustrative examples of titanium compounds include tetraisopropoxy titanate and tetrabutoxy titanate. Illustrative examples of the tin compounds include dibutyltin dilaurate, dibutyltin diacetate, dioctyltindicarboxylate, dimethyltindicarboxylate, and dibutyltin dioctoate. Illustrative examples of the zirconium compounds include zirconium octanoate. The moisture-cure catalysts may be employed in an amount sufficient to promote moisture-cure, which generally is from about 0.05% to about 5.00% by weight, and advantageously from about 0.5% to about 2.5% by weight.

The inventive compositions may also contain one or more amino-containing silane compounds which act as adhesion promoters. These amino-containing silane compounds may be present in amounts of about 0.1% to about 5.0% by weight of the composition. Desirably, these compounds are present in amounts of about 0.74% to about 1.4% by weight of the composition. Amino-containing silane compounds which are useful in the present invention include, but are not limited to, silane compounds containing amino-alkyl groups, such as gamma-ureidopropyltrimethoxy silane, 3-aminopropyl trimethoxysilane, N,N'-bis(3-trimethoxy silylpropyl)urea, gamma-aminopropyltrimethoxysilane, N-(2-aminoethyl)-3-aminopropyltriethoxysilane, N-(2-aminoethyl)-3-aminopropyltrimethoxysilane, trimethoxysilylpropyldiethylene triamine, tertiary alkyl carbamate silane, and aminoethyl-3-aminopropyl-methyl-dimethylsilane. Other desirable amino-containing silane compounds include silane compounds containing amino-cycloaliphatic groups such as methyl tris (cyclohexylamino)silane and silane compounds containing amino-aromatic groups such as methyl tris-(N-methylbenzamido)silane. Adhesion promoters may be present in amounts of up to about 5%, and desirably up to about 2% by weight.

Examples of useful commercially available adhesion promoters include octyl trimethoxysilane (commercially available from Witco Corporation, Greenwich, Conn. under the trade designation A-137), glycidyl trimethoxysilane (commercially available from Witco under the trade designation A-187), methacryloxypropyl trimethoxysilane (commercially available from Witco under the trade designation of A-174), vinyl trimethoxysilane, tetraethoxysilane and its partial condensation products, and combinations thereof.

The inventive compositions may also contain other additives so long as they do not inhibit the curing mechanism, elongation, or intended use. For example, conventional additives such as fillers, antioxidants, adhesion promoters, pigments, moisture scavengers, inhibitors, odor masks, and the like may be included. Plasticizers such as alkylsulfonic acid phenyl esters are useful in the present invention. Moisture scavengers such as methyltrimethoxysilane and vinyltrimethyloxysilane are also useful in the present invention. Thixotropic additives such as the polyamide sold under the trade name Disparlon® 6500 may be used.

As a basic filler, the present composition may also include a precipitated calcium carbonate. Any commercially available precipitated calcium carbonate can be used with the present invention. The precipitated calcium carbonate should be present, for example, in an amount from about 5 to about 60% by weight of the total composition. Desirably, the calcium carbonate is present in an amount from about 20 to about 40% by weight of the composition.

In another aspect, the present invention relates to a composition which includes:
 a) a moisture curable silyl functionalized polyacrylate; and
 b) at least one shrinkage-reducing component which reduces shrinkage of the cured composition upon exposure of the cured composition to a hydrocarbon fluid, where the shrinkage-reducing component is present in an amount to reduce shrinkage of the cured composition when the cured composition is exposed to a hydrocarbon fluid,
where the moisture curable silyl functionalized polyacrylate is as discussed above, and the shrinkage-reducing component is as discussed above for the hydrocarbon-fluid absorbing component.

The present invention also relates to a method of preparing a shrinkage-resistant composition, the method including the steps of:
 a) providing a silyl functionalized polyacrylate; and
 b) mixing the polyacrylate with a hydrocarbon fluid-absorbing component, where the silyl functionalized polyacrylate is as discussed above, and the shrinkage-reducing component is as discussed above for the hydrocarbon-fluid absorbing component.

In another aspect, the present invention relates to a method of using the compositions of the present invention, the method including the steps of:
 a) providing a composition of the invention;
 b) permitting the composition to cure; and
 c) exposing the cured composition to a hydrocarbon fluid.

The compositions of the present invention may also be formed into many different configurations before curing. These articles may be used in various industries where there is a need for oil-shrinkage resistant elastomeric articles. In the vehicular assembly industry, for example, O-rings, hoses, seals, and gaskets can be formed from the present compositions. Other conventional uses requiring good adhesive properties, as well as oil-shrinkage resistance are also contemplated for the inventive compositions.

In another aspect of the present invention, there is provided a method of applying a silicone composition to a surface that is exposed to oil during its intended use. The surface to which the present compositions are applied can be any work surface that is exposed to oil, such as certain work surfaces of conventional internal combustion engines. This method includes applying a composition of the present invention to the work surface.

The work surface may be constructed of a variety of materials, such as most metals, glass, and commodity or engineered plastics.

EXAMPLES

Table 1 shows the components included in typical formulations of the compositions of the present invention, showing each of their respective % weights by weight of the total composition Formulations A and D are representative of typical compositions of the invention. Formulations B and C are control compositions and lack the presence of a hydrocarbon fluid-absorbing component (Microthene® polyolefin powder).

TABLE 1

| Component | A | B | C | D |
|---|---|---|---|---|
| Silyl end-capped polyacrylate polymer[1] | 44.50 | 45.00 | 41.24 | 40.00 |
| aluminum powder in mineral oil | 0.50 | 0.50 | | |
| Microthene ® FN 510-00 | 2.00 | | | 3.00 |
| Disparlon ® 6500 | | | 2.06 | 2.00 |
| Alkylsulfonic acid phenyl ester | 8.00 | 8.00 | 15.46 | 15.00 |
| Calcium Carbonate | 41.00 | 43.00 | 33.71 | 32.70 |
| Graphite | | | 0.52 | 0.50 |
| Irganox ® 1010[2] | 1.00 | 1.00 | 4.12 | 4.00 |
| Aminopropyltrimethoxysilane | 1.00 | 1.00 | 1.03 | 1.00 |
| Vinyltrimethoxysilane | 1.00 | 1.00 | 1.03 | 1.00 |
| Dibutyltindilaurate | 1.00 | 0.50 | 0.83 | 0.80 |
| Total (%) | 100.00 | 100.00 | 100.00 | 100.00 |

[1]Kaneka ® Polyacrylate OR100S
[2]Tetrakis [methylene (3,5-di-t-butyl-4-hydroxy-hydrocinnamate)methane]

A typical procedure for preparing formulations of the invention is as follows:

A mixer is charged with the silyl end-capped polyacrylates polymer and the antioxidant are mixed until wetted in. While gradually heating to 100° C., calcium carbonate, graphite, and the polyolefin powder are added to the mixer until wetted in. The mixture is stirred at high speed under vacuum at 110° C. for 2 hours. The mixture is cooled to a temperature of about 55° to 60° C., and the reactive liquid is added, upon which it is scraped down. The mixture is then stirred under vacuum for 10 minutes. The mixture is then further cooled. As the mixture reaches room temperature (40° to 50° C.), aminopropyltrimethoxysilane, vinyltrimethoxysilane, and dibutyltindilaurate are added under nitrogen, and the mixture is stirred for 15 minutes. It is scraped down, and stirred under vacuum for 15 minutes while cooling to less than 50° C.

Table 2 shows the change in volume of samples of Formulations A and B from Table 1 when exposed to hydrocarbon fluids. Formulations A1-A3 contain a polyolefin powder hydrocarbon fluid-absorbing component, while Formulations B1-B3 do not. As can be seen from the results, there is significantly less shrinkage in the formulations containing the polyolefin powder.

Oil submersion sample data were obtained after the samples were submerged in General Motors transmission fluid ETL 9097®, for 48 hours at 150° C. Cooling period data were obtained after the oil containing the samples was allowed to cool to room temperature over a period of 48 hours.

TABLE 2

| Sample No. | % Swell | % Weep |
|---|---|---|
| A1 | −2.454 | −0.048 |
| A2 | −2.528 | −0.089 |
| A3 | −2.620 | −0.136 |
| B1 | −6.306 | −0.371 |
| B2 | −6.290 | −0.255 |
| B3 | −6.252 | −0.232 |

Table 3 shows the change in volume of Formulations C and D after being submerged in Oil 1 or Oil 2 for one week at 150° C. As can be seen from the data, shrinkage of Formulation D is significantly less than that of control Formulation C. Oil 1 is transmission fluid sold under the trade name RDL 3434® by General Motors. Oil 2 is transmission fluid sold under the trade name ETL 9588®, also by General Motors.

TABLE 3

| | Formulation C (% swell) | Formulation D (% swell) |
|---|---|---|
| Oil 1 | −21.00 | −9.02 |
| Oil 2 | −22.39 | −9.59 |

What is claimed is:

1. An uncured gasket composition curable at room temperature on a first sealing surface and positionable against a second sealing surface comprising a mixture of:
    a) a moisture curable silyl functionalized polyacrylate having the structure,

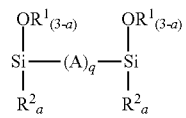

wherein each $R^1$ is independently selected from a $C_1$ to $C_6$ alkyl, each $R^2$ is independently selected from a $C_1$ to $C_{10}$ alkyl, a is integer from 0-3, q is an integer from 2 to about 1,000, and A is a hydrocarbon diradical containing at least one (meth)acrylate linkage;
    b) at least one component which reduces shrinkage of the cured composition upon exposure of the cured composition to a hydrocarbon fluid, wherein the component is present in an amount sufficient to reduce shrinkage of the cured composition when exposed to a hydrocarbon fluid as compared to the same cured composition without the at least one component;
    c) optionally a filler; and
    d) optionally a moisture-cure catalyst.

2. The composition of claim 1, wherein the component is a polyolefin.

3. The composition of claim 1 wherein the component is a polyolefin in particulate form dispersed in the composition.

4. The composition of 1, wherein the component is present in an amount of about 1% to about 20% by weight of the composition.

5. The composition of claim 3, wherein the polyolefin in particulate form has an average particle size of about 0.1 to about 50 microns.

6. A method of using the composition of claim 1, comprising the steps of:
    a) providing the composition of claim 1;
    b) permitting the composition to cure; and
    c) exposing the cured composition to a hydrocarbon fluid.

7. A composition comprising:
    a) a moisture curable silyl functionalized polyacrylate; and
    b) a polyolefin in particulate form present in an amount sufficient to reduce shrinkage of the cured composition when exposed to a hydrocarbon fluid.

8. The composition of claim 7, wherein the polyolefin in particulate form has an average particle size of about 0.1 to about 50 microns.

9. A method of using the composition of claim 7, comprising the steps of:
    a) providing the composition of claim 7;
    b) permitting the composition to cure; and
    c) exposing the cured composition to a hydrocarbon fluid.

10. The composition of claim 1, wherein the component is polyethylene.

11. A method of reducing shrinkage of a gasket comprising a cured polyacrylate composition the shrinkage caused by exposure of the cured polyacrylate composition to a hydrocarbon fluid, including the steps of:
    providing a curable silyl functionalized polyacrylate polymer;
    preselecting an amount of the shrinkage-reducing component sufficient to reduce volume change of the cured polyacrylate composition caused by exposure to a hydrocarbon fluid;
    mixing the silyl functionalized polyacrylate polymer and the preselected amount of a shrinkage-reducing component to form a curable polyacrylate composition; and
    permitting the polyacrylate composition to cure.

12. The method of claim 11 further comprising curing the polyacrylate composition on a substrate to be sealed.

13. The method of claim 11 further comprising curing the polyacrylate composition on a substrate to be sealed and subsequently exposing the cured polyacrylate composition to a hydrocarbon fluid.

14. The method of claim 11 wherein the shrinkage-reducing component is a polyolefin.

15. The method of claim 11 wherein the shrinkage-reducing component is polyethylene.

16. The method of claim 11 wherein the curable silyl functionalized polyacrylate has the structure,

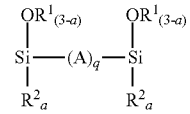

wherein each $R^1$ is independently selected from a $C_1$ to $C_6$ alkyl, each $R^2$ is independently selected from a $C_1$ to $C_{10}$ alkyl, a is integer from 0-3, q is an integer from 2 to about 1,000, and A is a hydrocarbon diradical containing at least one (meth)acrylate linkage.

* * * * *